H. W. SISSON.
FIRE HOSE COUPLING.
APPLICATION FILED APR. 1, 1914.
1,153,406.
Patented Sept. 14, 1915.
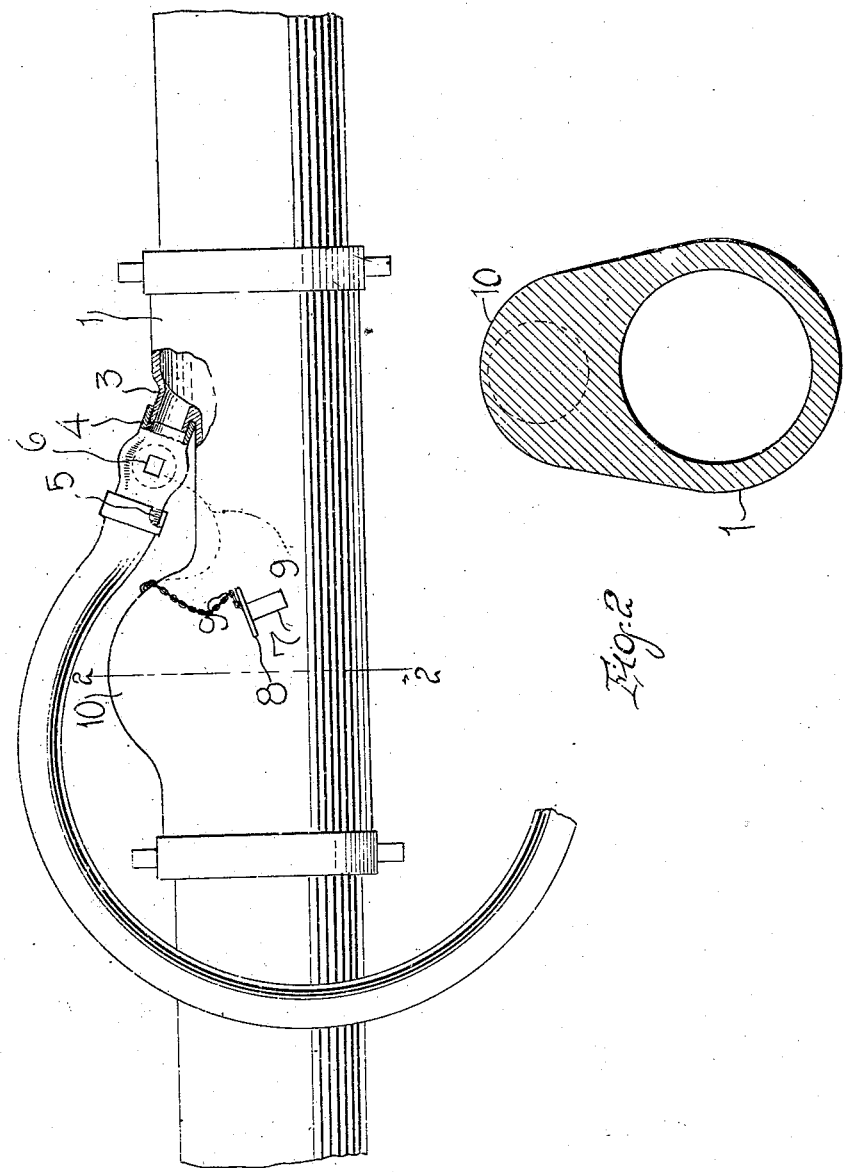
Inventor
HENRY W. SISSON
By Watson E. Coleman
Attorney
Witnesses
Robert M. Lutphen
A. S. Hind

UNITED STATES PATENT OFFICE.

HENRY W. SISSON, OF LAKE GEORGE, NEW YORK.

FIRE-HOSE COUPLING.

1,153,406.  Specification of Letters Patent.  Patented Sept. 14, 1915.

Application filed April 1, 1914. Serial No. 828,904.

*To all whom it may concern:*

Be it known that I, HENRY W. SISSON, citizen of the United States, residing at Lake George, in the county of Warren and State of New York, have invented certain new and useful Improvements in Fire-Hose Couplings, of which the following is a specification, reference being had to the accompanying drawings.

This invention relates to hose for conveying water and more particularly to a coupling adapted to be applied to connect the two sections of a fire hose.

The primary object of my invention is the provision of a coupling having a relatively large diameter and adapted to connect two sections of fire hose together which coupling is provided with means for connecting it to a relatively small coupling whereby a relatively small hose may be connected to the main hose. By this arrangement it is possible to take from the main stream a relatively small stream which may be used for putting out fires in situations where a large stream would do a great deal of damage.

A further object of the invention is the provision of a connection with a coupling for relatively large sections of hose, of a coupling branching therefrom and having a small diameter relative to the main coupling, this coupling adapted to be detachably connected to the main coupling and being provided with a valve whereby the passage of water through the auxiliary hose may be controlled.

Other objects will appear in the course of the following description.

Further and more specific details of construction will hereinafter be fully pointed out and claimed.

In the accompanying drawing, forming a part of this specification, and in which like characters of reference designate corresponding parts: Figure 1 is a side elevation of a fire hose coupler embodying the improvements of my invention, parts being broken out, and Fig. 2 is a transverse sectional view on the line 2—2 of Fig. 1.

The main coupling 1 is provided at each end with threads to be engaged by the ordinary coupling rings carried by the end of a fire hose. It is designed that this coupling shall be attached to the fire hose at a point fifty feet or so back of the nozzle, so that the use of an extra long auxiliary hose will be eliminated. Adjacent to one end of the coupling is formed an inclined, exteriorly threaded nipple 3 having orifice therein communicating with the interior of the coupling and disposed at an angle oblique to the longitudinal axis of the coupling, and this nipple is engaged by the threaded end of an auxiliary coupling 4, the other end of which is provided with the usual threads 5 to be engaged by the coupling ring of a relatively small auxiliary hose. The intermediate portion of the coupling 4 is provided with a valve which will normally cut off passage of water therethrough, and this valve is provided with a square socket 6 to be engaged by a like shaped shank 7 of a valve key, the latter being provided with a circular head 8 by which it may be turned to open the valve, and is connected with the coupler by a chain 9.

In order to protect the auxiliary coupling 4 from injury when the fire hose is being dragged over the ground, the coupling 1 is provided adjacent to the coupling 3 with a lateral extension 10 constituting a guard or shield which will be of a transverse width somewhat greater than that of the coupling 4, and which will have a lateral projection sufficient to protect the threaded end 5 of the coupler from damage.

When the fire hose is used as under ordinary conditions, the valve in the coupling 4 is closed, but should it be desired to use the latter for the purpose of quenching a small fire, a relatively small auxiliary hose such as a garden hose is attached to the threaded end thereof and the shank 7 of the key is inserted in the socket 6 of the valve, and the latter turned, thereby permitting passage of the water to the branch or supplemental hose.

While the improvement herein defined is simple in character, it will be found of thoroughly practical value in use, inasmuch as the damage that follows from the use of a large stream of water to quench a small fire will be obviated and no appreciable cost will be added to the cost of the main coupling hose.

Having thus described my invention, what I claim is:

A coupling of the character described including a main body portion having a relatively large uniform interior diameter and formed with a nipple projecting therefrom at an acute angle to the axis of the coupling, a relatively small auxiliary coupling connected to said nipple, and a valve disposed in the auxiliary coupling controlling the passage of water therethrough, the main body portion of the coupling having a lateral enlargement adjacent to the auxiliary coupling and toward which the auxiliary coupling and nipple extend, said enlargement extending outward to a plane beyond the plane of the extremity of the auxiliary coupling to thereby protect the latter from injury when the coupling is dragged over the ground in the direction toward which the auxiliary coupling and nipple extend.

In testimony whereof I hereunto affix my signature in the presence of two witnesses.

HENRY W. SISSON.

Witnesses:
ARTHUR F. WEST,
R. CUTLER BRADLEY.